UNITED STATES PATENT OFFICE.

THOMAS J. DUFFIN, OF CHICAGO, ILLINOIS.

FLUID PAINT COMPOSITION.

1,362,241.  Specification of Letters Patent.  Patented Dec. 14, 1920.

No Drawing.  Application filed July 1, 1920. Serial No. 393,438.

*To all whom it may concern:*

Be it known that I, THOMAS J. DUFFIN, a citizen of the United States, residing at 837 Exchange avenue, Chicago, in the county of Cook and State of Illinois, have invented a new and useful Improvement in Fluid Paint Composition, of which the following is a specification.

The present invention relates to liquid paint compositions, and more particularly to such compositions suitable for use for the protection of metal surfaces by reason of their close adhesion and water shedding properties and for the protection of wood surfaces by reason of their preservative and fungicidal properties.

The fluid paint compound, in accordance with the present invention, comprises roofing tar, an asphaltic, plastic solid composition which may contain 10 to 15% of asbestos, together with a suitable proportion of gas main liquor. The roofing tar may consist of about 35–40% of petroleum pitch (of asphaltic character) 10–15% of asbestos and 45 to 50% of coal tar, these ingredients being thoroughly intermixed while heated to effect fusion. The gas main liquor, which is the liquid recovered in traps from gas mains, contains approximately 24% of light oil (b. p. 110–170° C.), 55–57% of carbolic oils (b. p. 170–225° C.) and 14% of creosote oils (b. p. 225–270° C.) with small proportions of naphtha and pitch.

In preparing the fluid paint composition, the roofing tar is admixed with the gas main liquor in approximately equal proportions, being substantially dissolved therein. The paint formed is black and is applicable with a brush, by reason of its fluidity. It is highly useful in the painting of metallic surfaces, for example, bridge and structural iron work, by reason of its strong adhesion to the surface, its durability, its ready drying quality, and its moisture-shedding qualities, by reason of which it is substantially waterproof. It is also useful in the painting of the surfaces of wood ties, piles, posts, and other articles exposed to the influences of water and air, or in contact with the earth, by reason of its capacity of penetration and its highly antiseptic and fungicidal qualities as well as its resistance to water.

The paint, as thus prepared, may contain from 5 to 7.5% of asbestos, which quantity may be increased or decreased if desired. The proportion of gas main liquor may likewise be increased if a more fluid or penetrative paint is desired.

Having thus described the nature of my invention, I claim:

1. A fluid paint composition comprising roofing tar and waste liquor from gas mains.

2. A fluid paint composition consisting of substantially equal proportions of a roofing tar of asphaltic character and of waste liquor from gas mains, the paint containing 5 to 7.5% of asbestos.

3. A fluid paint composition comprising a roofing tar of asphaltic character and waste liquor from gas mains containing about 24% light oil, 55–57% carbolic oils and 14% of creosote oils with small proportions of naphtha and pitch.

THOMAS J. DUFFIN.